2,931,669

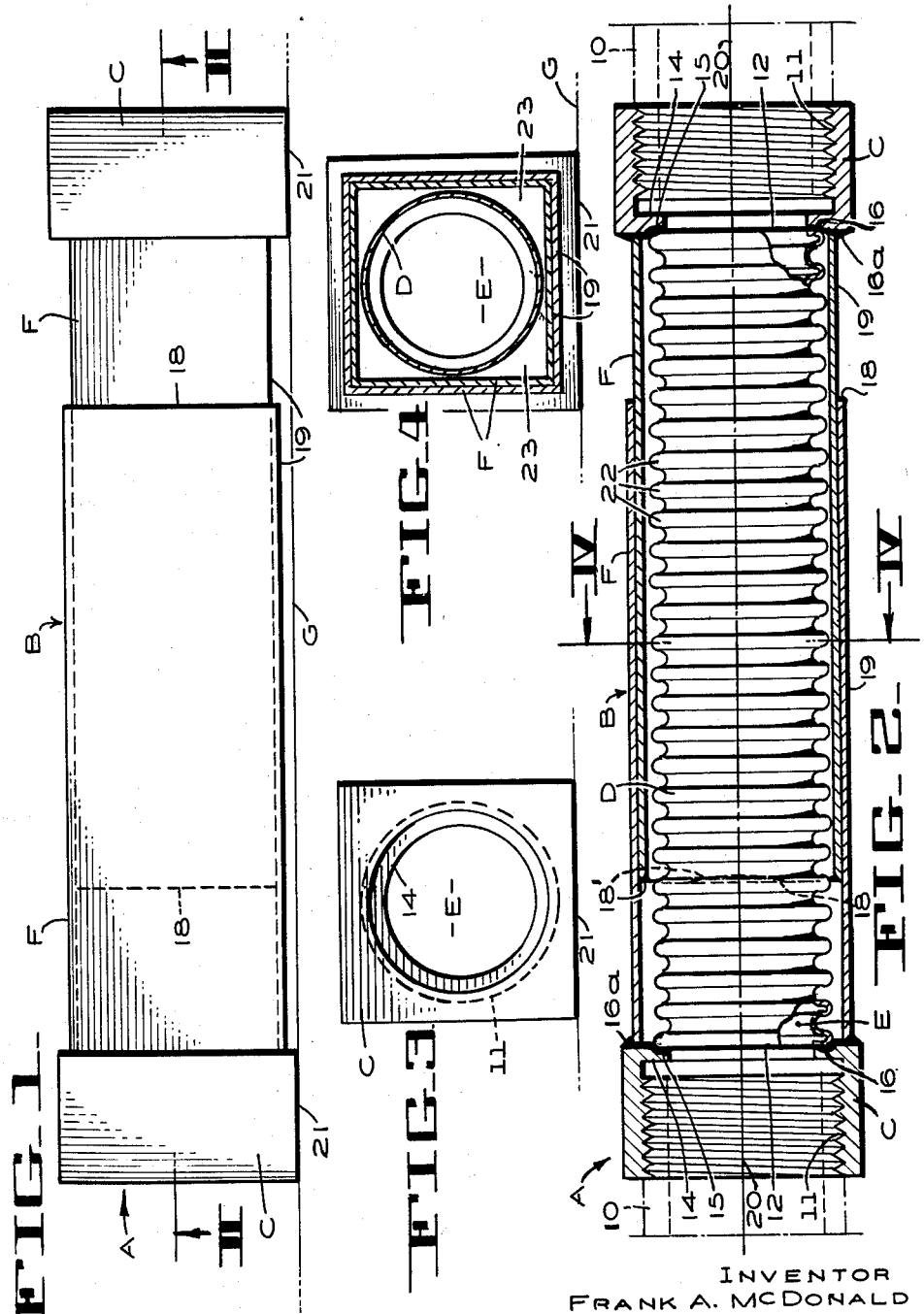
April 5, 1960 — F. A. McDONALD — 2,931,669
EXPANSION COMPENSATOR WITH ANTI-TORQUE DEVICE
Filed Oct. 22, 1956
INVENTOR
FRANK A. McDONALD
BY Munn & Liddy
ATTORNEYS

EXPANSION COMPENSATOR WITH ANTI-TORQUE DEVICE

Frank A. McDonald, San Francisco, Calif.

Application October 22, 1956, Serial No. 617,640

2 Claims. (Cl. 285—45)

The present invention relates to improvements in an expansion compensator with anti-torque device. It consists of the combinations, constructions and arrangement of parts, as hereinafter described and claimed.

It is a well-known fact that expansion compensators are used to provide the necessary expansion in high and low pressure steam and hot water lines; and, also, in other situations where pipes are subjected to shock load, vibration and temperature changes, for example, in aircraft and the guided missile field. Such a compensator includes a bellows through which the fluid or liquid flows, and is provided with couplings that are utilized for connecting the expansion compensator into a pipe line. Compression of the bellows absorbs the thermal or other expansion and creepage of the pipes, and eliminates the danger of uncontrolled expansion of the line. When the pipes cool off, or shock and vibration cease, the bellows permit the pipes to return to normal length.

However, experience has shown that the bellows is often subjected to torque, due to the pipe fitters twisting one end coupling relative to the other. Of course, the torque thus set up in the bellows will be increased as the bellows is compressed, which may result in rupturing the bellows.

Accordingly, and as a cardinal object of this invention, I provide an anti-torque device which will hold the end couplings from being rotated relative to each other. The bellows is secured to these couplings during assembly of the expansion compensator, free of any torque.

More specifically described, each expansion compensator is provided with a pair of tubular shrouds of non-circular cross-section, which telescope with each other with a sliding fit. These shrouds are anchored to the couplings, and their non-circular telescoping sections hold the couplings against relative rotation.

As a still further object of the invention, it is proposed to provide an expansion compensator which is so designed that it may rest against a support, with the minimum amount of friction with the support, thus facilitating the expansion and contraction of the compensator during use.

Other objects and advantages will appear as the specification continues. The novel features will be set forth in the claims hereunto appended.

Drawing

For a better understanding of the invention, reference should be had to the accompanying drawing, forming part of this specification, in which:

Figure 1 is a side elevational view of my expansion compensator with anti-torque device;

Figure 2 is a longitudinal sectional view taken along the plane II—II of Figure 1;

Figure 3 is an end view of one of the couplings (both being identical); and

Figure 4 is a transverse sectional view taken along the plane IV—IV of Figure 2.

While I have shown only the preferred form of my invention, it should be understood that various changes, or modifications, may be made within the scope of the annexed claims without departing from the spirit thereof.

Detailed description

In carrying my invention into practice, there is provided an expansion compensator which is designated generally at A, while the anti-torque device is indicated at B. Of course, the expansion compensator and anti-torque device form a unitary structure.

As clearly shown, a pair of spaced-apart end couplings C are provided, which may be connected to pipe sections 10 of a conduit line by any suitable means, for example, by threads 11 formed on the interior of the couplings (see Figure 2).

Moreover, a tubular bellows D extends the full distance between the couplings C, the bellows having opposite ends 12, each being anchored to one of the couplings in fluid-tight relation therewith. For this purpose, each coupling has been provided with an internal flange 14, the latter being fashioned with an annular groove 15 in which the adjacent end 12 of the bellows is accommodated. The opposite ends 12 of the bellows may be brazed at 16 to the flanges 14 (see Figure 2), or otherwise anchored thereto.

It will be noted that the couplings C and bellows D provide a conduit or passageway E through which fluid or liquid may be conveyed between the pipe sections 10. Each of the couplings C has a tubular shroud F secured thereto, such as part 16a of the brazing 16, with one shroud telescoping into the other with a sliding fit, whereby the couplings C may be moved toward and away from one another. These shrouds enclose the bellows D in adjacent relation therewith to prevent buckling of the bellows during compression; that is, when the pipe sections 10 are moved toward one another due to thermal changes, shock load or vibration.

In Figure 4 of the drawing, the shrouds F are disclosed as being non-circular in cross-section, whereby the couplings C are held against rotation with respect to each other by the non-circular telescoping sections of the shrouds. This will relieve the bellows of torque when the pipe fitter connects the couplings C to the pipe sections 10. Although the shrouds have been illustrated as being square, it will be apparent that other non-circular cross-sections may be employed, as long as one shroud cannot turn relative to the other.

Referring to Figures 1 and 2, it will be observed that the tubular shroud F on each coupling C has a free end 18 disposed to abut the other coupling, when the couplings are moved toward one another through a predetermined distance, thereby limiting compression of the bellows.

As an important structural feature, it should be noted that the longitudinal exterior surfaces 19 of the shrouds F are spaced inwardly toward the axis 20 of the bellows from the longitudinal exterior surfaces 21 of the couplings C, whereby the couplings may rest against a support G with the shrouds being spaced from the support. This will result in reducing the amount of friction between the compensator and the support, thus facilitating compression and expansion of the compensator during use. This construction also minimizes the possibility of foreign matter being forced into or accumulating around the sliding connection between the shrouds and preventing telescopic motion of the shrouds. In the drawing, the longitudinal exterior surface 21 of each coupling defines flat faces, which are adapted to bear against the support G.

The bellows D defines a series of convolutions 22, and it is highly desirable to prevent foreign matter from becoming wedged between adjacent convolutions. Inasmuch as the shrouds F have been shown as being square in outline, while the bellows D is round, reference to Figure 4 will clearly disclose that the shrouds have interior portions spaced from the bellows to provide pockets 23. The latter are positioned to receive foreign matter gaining access to the interior of the shrouds, which otherwise would interfere with compression and expansion of the convolutions of the bellows.

As shown in Figure 2, the central portion of each wall of the inner shroud F is chamfered at 18' along its free end 18. This will facilitate the sliding of the inner shroud over the bellows D, when the end couplings C are moved toward one another.

I claim:

1. In an expansion compensator with anti-torque device for use in a conduit system primarily in building construction, said system carrying fluids varying considerably in temperature from ambient temperatures: a pair of spaced-apart couplings, conduit connecting means integral with each of said couplings, a flexible cylindrical bellows having uniform corrugations extending between the couplings, the bellows having opposite ends, each opposite end being rigidly anchored directly to one of the couplings in fluid-tight relation therewith and substantially concentric with and in fluid communication with said connecting means, the couplings and bellows providing a fluid carrying conduit, each of the couplings having rigidly secured thereto about its entire periphery a tubular solid-walled non-flexible shroud, with one shroud snugly telescoping into the other with a sliding fit along a substantial part of the lengths of the shrouds whereby the couplings may be guided in movement toward and away from one another, the shrouds extending entirely around and completely encasing the bellows and being disposed exteriorly of the bellows in closely spaced adjacent relation therewith and forming a sliding connection which is rigid in all directions transverse of said bellows to prevent buckling of the bellows during compression or extension thereof and to prevent the lateral shifting of one of said couplings with respect to the other, said sliding connection being located intermediate the ends of said bellows, each of the shrouds having an identical shaped non-circular cross-section, each defining a plurality of unobstructed flat-faced sides, the shrouds having sufficient rigidity to resist twisting about their axes, whereby the couplings are held against rotation with respect to each other by the non-circular telescoping sections of the shrouds, thereby relieving the bellows of torque, each of the couplings having a plurality of complementarily disposed equally dimensioned parallel flat faces on its exterior peripheral surface, the flat faces of the couplings being unobstructed by any other parts of the compensator whereby corresponding selected faces of the couplings may be placed simultaneously against a substantially flat support, the entire periphery of the shrouds being spaced inwardly toward the axis of the bellows from the flat faces of the couplings, whereby the shrouds will be held out of contact with the support throughout their full length, thereby minimizing the amount of foreign matter which may be forced into or accumulate around said sliding connection and thereby act to prevent telescopic motion of said sliding connection during compression and extension of the compensator due to temperature fluctuations in the fluid carried thereby.

2. The expansion compensator of claim 1 including said shrouds having interior portions spaced from the bellows to provide pockets which extend the full length of the shrouds, said pockets being formed by the flat sides of the shrouds at the points where adjacent ones of the latter sides join each other, said pockets facing inwardly toward said bellows and being positioned to receive foreign matter which has gained access to the space between the bellows and the shrouds which matter otherwise would interfere with compression of the convolutions of the bellows.

References Cited in the file of this patent

UNITED STATES PATENTS

| 1,354,706 | Warriner | Oct. 5, 1920 |
| 1,355,946 | Dietrich et al. | Oct. 19, 1920 |
| 1,726,483 | Giesler | Aug. 27, 1929 |
| 1,786,506 | Ray | Dec. 30, 1930 |
| 2,317,598 | Francois | Apr. 27, 1943 |
| 2,565,296 | Chyle | Aug. 21, 1951 |
| 2,678,228 | Gerhardt | May 11, 1954 |
| 2,758,612 | Zaleski | Aug. 14, 1956 |

FOREIGN PATENTS

| 544,805 | Great Britain | Apr. 28, 1942 |
| 658,505 | Great Britain | Oct. 10, 1951 |